United States Patent [19]
Sauska et al.

[11] Patent Number: 5,422,487
[45] Date of Patent: Jun. 6, 1995

[54] WASTE WATER PURIFICATION SYSTEM WITH COMPLEMENTARY INTERLOCKING GERMICIDAL LAMP AND SOCKET CONSTRUCTION

[75] Inventors: Christian Sauska; George Csoknyai, both of Orange, Conn.

[73] Assignee: Light Sources, Inc., Milford, Conn.

[21] Appl. No.: 280,946

[22] Filed: Jul. 27, 1994

[51] Int. Cl.⁶ .............................................. H01J 5/50
[52] U.S. Cl. .............................. 250/436; 250/504 R; 313/318.06
[58] Field of Search ........................ 250/436, 504 R; 313/318, 493, 634

[56] References Cited
U.S. PATENT DOCUMENTS

4,700,101 10/1987 Ellner et al. ........................ 250/436
5,166,527 11/1992 Solymar ............................. 250/436

*Primary Examiner*—Jack I. Berman
*Attorney, Agent, or Firm*—Fattibene and Fattibene; Arthur T. Fattibene; Paul A. Fattibene

[57] ABSTRACT

A waste water purification system with complementary interlocking germicidal lamp and socket construction to prevent unintentional disconnection of the lamps. This is attained by providing the germicidal lamps with locking contact pins arranged to be latched and locked to its complementary socket by providing the socket with keyhole slots for receiving the contact pins and associated spring biased displaceable contacts to maintain electric contact between the lamp and its socket in the assembled position. In one form of the invention, the contact pins of the lamps are longitudinally offset and spaced apart to prohibit arcing between the contact pins of the respective lamp electrodes. Other embodiments of the disclosure effect the interlocking of the lamp to its socket by complementary latching members formed on the end of the lamp and its corresponding socket.

22 Claims, 5 Drawing Sheets

WASTE WATER PURIFICATION SYSTEM WITH COMPLEMENTARY INTERLOCKING GERMICIDAL LAMP AND SOCKET CONSTRUCTION

This invention relates to a waste water purification system and more specifically to a water purification system having a germicidal lamp and associated socket provided with complementary interlocking components to effect a positive mechanical interlock therebetween.

PRIOR ART

In the past, treatment plants such as waste water treatment plants used chlorine for disinfection and purification. However, accidental over-chlorination can be detrimental to fish and animal life present in the bodies of water into which such treated waste water is discharged. Over-chlorination can also adversely affect water quality. Chlorine by-products may also be carcinogenic.

More recently, waste water treatment plants are disinfecting the liquid effluent by ultraviolet light before discharging the liquid effluent into a neighboring body of water. Ultraviolet treating apparatus for effecting such disinfectant process generally comprises a housing having disposed therein a series of ultraviolet lamps over which the waste water to be treated flows. The ultraviolet disinfection disrupts the microbial modules, thereby rendering them incapable of reproducing and ineffective. However, in such ultraviolet disinfecting apparatus, it was customary to arrange the ultraviolet lamps in banks with each lamp secured in conventional sockets wherein the terminal or contact pins of each lamp was simply frictionally fitted to its corresponding socket. It has been noted that the flow of water and turbulence created within such water treatment apparatus invariably imparts a vibratory motion to the lamps, which frequently resulted in the lamps being vibrated or shaken loose of its socket, causing the lamps to be rendered inoperative. When such event occurred, the water being treated is not totally disinfected.

OBJECTS OF THE INVENTION

An object of this invention is to provide a germicidal lamp for use in waste water treatment apparatus that has terminal or contact pins that engage a complementary socket in a manner to effect a readily detachable connection therebetween, and which is positively mechanically locked within the socket so as to prohibit any accidental detachment or separation therebetween.

Another object is to provide a germicidal lamp having laterally and longitudinally offset terminal or contact pins engaging a complementary socket wherein certain of the terminal or contact pins are securely locked in the operative position thereof so as to prohibit any accidental detachment between the lamp and its socket.

Another object is to provide a waste water purification system having a plurality of germicidal lamps and an associated socket constructed to effect a detachable interlock between each lamp and its socket in a positive manner so as to prohibit any unintentional disconnection of the lamp during the operation of the waste water purification system.

SUMMARY OF THE INVENTION

The foregoing objects and other features of the invention as related to waste water purification systems are attained by a germicidal lamp and complementary socket having complementing components which are arranged to mate and lock in a positive manner so as to prevent or prohibit any accidental separation therebetween. In one form of the invention, this is attained by forming the contact pins of a germicidal lamp with an enlarged head arranged to be received in a female socket having a keyhole slot which may be formed with an undercut groove so that upon axial insertion of the lamp into the socket and with a slight relative rotation between the lamp and the socket, the contact pins of the lamp are positively locked within the socket. Operatively associated with each keyhole slot is a spring biased contact for effecting and maintaining electrical contact between the lamp and the socket in the operative position. The arrangement is such that when the lamp is inserted and locked within the socket, the spring biased contacts will normally urge the enlarged head of the terminal pins to seat in the undercut groove whereby the lamp cannot be removed with first having an axial force applied thereto before detaching the lamp by a counter rotational movement. In an alternate form of the invention, the contact or terminal pins may be longitudinally offset. In other alternate forms, the lamp and socket may be provided with complementary locking collars and latches for maintaining the lamp positively locked when coupled to its complementary socket.

DETAIL DESCRIPTION

Figure 1:
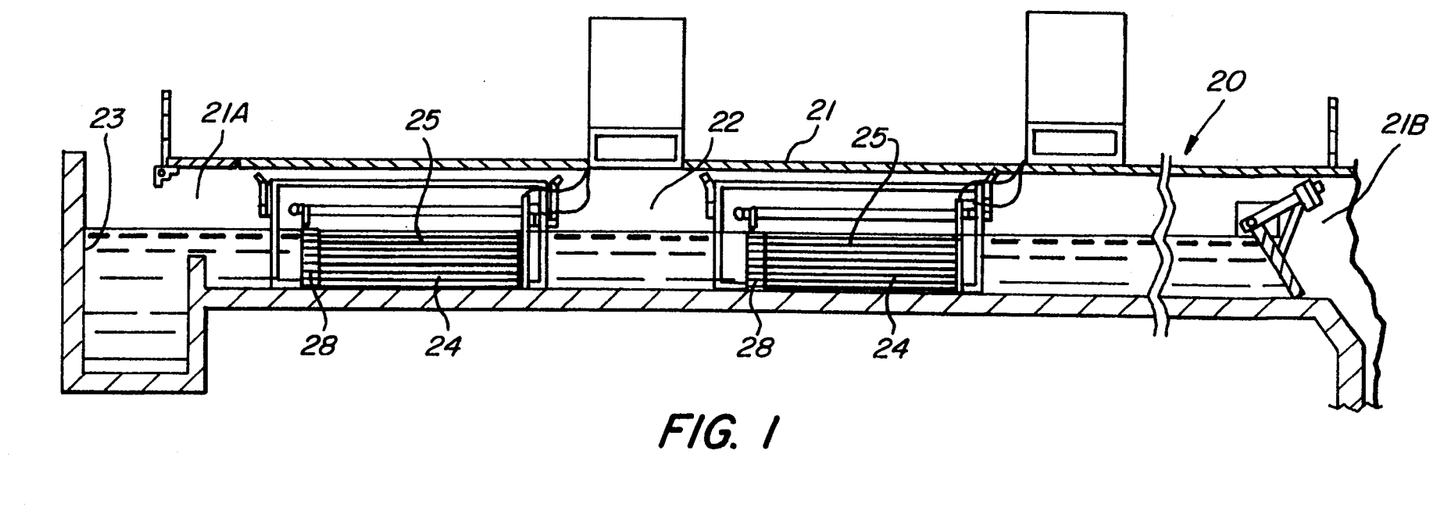
FIG. 1 illustrates a waste water treating apparatus illustrating the use of ultraviolet lamps for disinfecting the waste water being treated.

Referring to FIG. 1, there is illustrated a conventional or well known type of a waste water treating apparatus 20 for handling and disinfecting the liquid effluent of a sewage disposal facility. As shown, the apparatus 20 comprises a suitable housing 21 defining a flow chamber 22 through which the effluent liquid or water being treated flows. One end of the chamber 21A is disposed in communication with a reservoir or source 23 of waste effluent or water. The other end of the flow chamber 21B defines the discharge end through which the treated effluent or water is discharged in a disinfectant state to a suitable body of water or surrounding environment. To effect the disinfecting or purification of the waste water, one or more banks 24 of germicidal or ultraviolet lamps 25 are disposed within the flow path of the effluent or waste water to be treated. As shown, the lamps 25 are longitudinally disposed so as to be in parallel flow relationship to the waste water flowing therearound.

Figure 2:
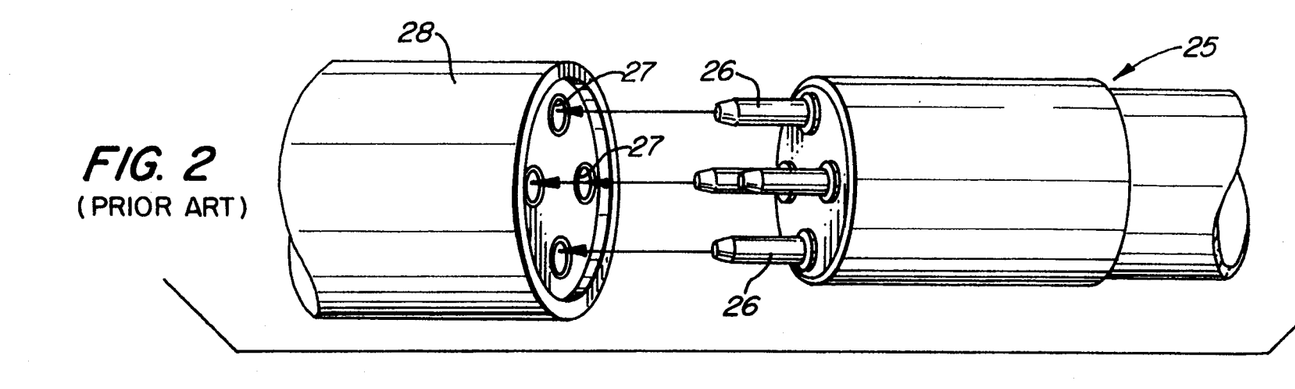
FIG. 2 illustrates a partial perspective view of a prior art construction showing how an ultraviolet lamp had been coupled to a complementary socket when utilized in a waste water treating apparatus of FIG. 1.

Germicidal lamps 25, which have been utilized in the described waste treatment apparatus, are constructed with the contact pins 26 disposed at one end of an elongated lamp 25 as best seen in FIG. 2; and as more particularly described in U.S. Pat. No. 4,700,101 granted Oct. 13, 1987. Such known lamp construction 25 are provided with straight contact pins 26, which are simply inserted into complementary pin holes 27 of an associated socket 28. It has been noted that due to the turbulence that is created and/or existent in a waste water treatment apparatus, the germicidal lamps 25 are subjected to a vibratory motion which may be sufficient to vibrate the lamps 25 out of their respective sockets 28, thereby disrupting or breaking the electrical connection between the lamp and its corresponding socket to de-energize the lamp. Thus, when the lamp is de-energized, the effluent or waste water in the vicinity of such disconnected lamp is either not disinfected or is only partially disinfected.

To obviate this problem, FIGS. 3 to 6 illustrate an improved germicidal lamp 30 and socket construction 31, the lamp 30 is positively locked to its complementary socket 31 in the operative connected position so that the lamp 30 cannot be vibrated out of its socket or accidentally disconnected when in use in a waste water treating apparatus.

Figure 3:
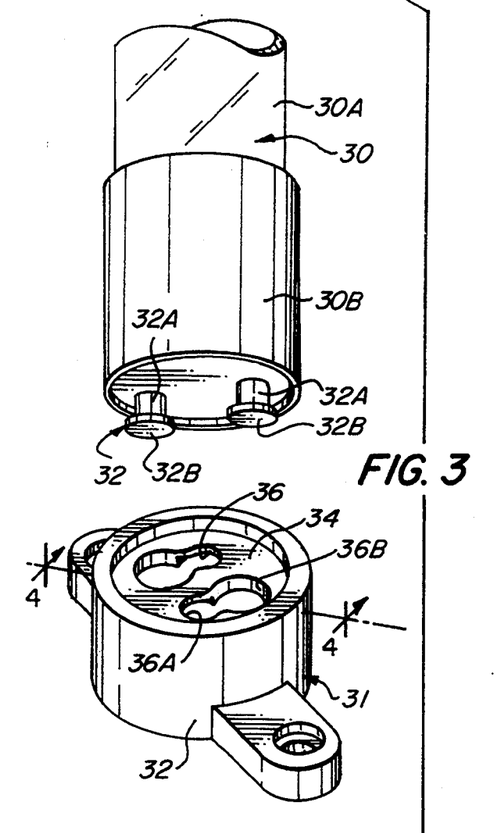
FIG. 3 is an exploded perspective view of an ultraviolet lamp and socket construction for use in a waste water treating apparatus embodying the present invention.

As shown in FIG. 3, the lamp 30 includes a quartz envelope 30A of conventional construction having an end cap 30B defining a terminal end of the germicidal lamp 30. In the illustrated embodiment, the germicidal lamp 30 has a pair of electrical terminals or locking contact pins 32 projecting from the end cap 30B. It will be understood that the number of terminal pins or contact pins 32 may vary depending upon the particular construction of the germicidal lamp. As shown in FIG. 3, the terminal pins 32 include a shank portion 32A, the free end of which is provided with an enlarged head end defined or illustrated as a flat contact disc 32B having a diameter which is greater than that of the shank portion 32A.

Figure 4:
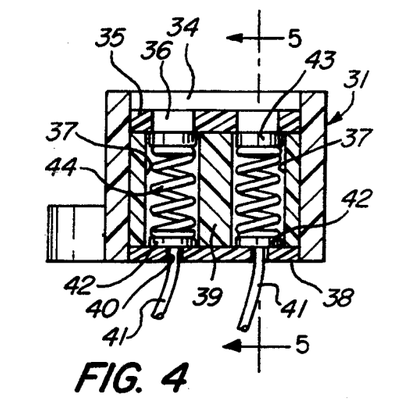
FIG. 4 is a sectional view showing the lamp socket construction of FIG. 3.

The complementary socket 31 for receiving the lamp 30 comprises a base 33 formed of a suitable non-conducting material. The base 33 includes a well or recess 34 for receiving the end of the germicidal lamp. As shown in FIG. 4, the bottom of the recess or well 34 is defined by a transverse wall 35 having formed therein a pair of apertures in the shape of keyhole slots 36. Referring to FIG. 3, each keyhole slot 36 is provided with small end portion 36A and a connected enlarged end portion 36B. The small end portion 36A has a diameter slightly larger than the diameter of the shank portion 32A of the contact pin 32 and the enlarged end portion 36B of the slot 36 has a diameter slightly larger than the enlarged disc end 32B of terminal pin 32. As shown, the enlarged end portions 36B and small end portions 32A of the respective slots are diametrically opposed.

Figure 5:
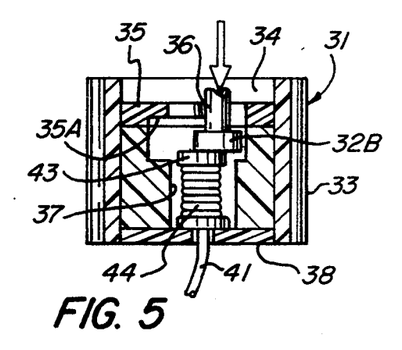
FIG. 5 is a detail sectional view illustrating the relative relationship of the component parts upon the initial insertion of the lamp into the socket.
Figure 6:
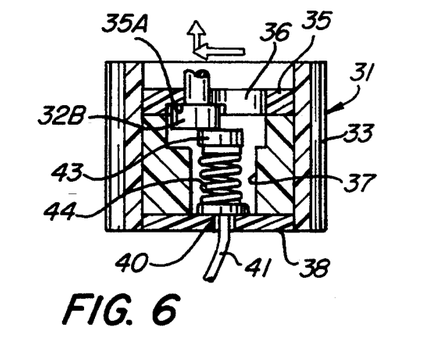
FIG. 6 is a detail sectional view illustrating the lamp in the locked and operative position.

Formed in the bottom of the base 33 and disposed in alignment with each of the keyhole slots 36 is a bore 37. A bottom wall 38 is suitably secured to the bottom end of the base 33 by a suitable fastener 38A. The bottom wall 38 is provided with aperture 40 for accommodating each of the conductor wires 41—41, the ends of which connect to an associated electrical contact 42 disposed within the respective bores 37. Slidably disposed within each bore is a floating electric contact 43. A metal spring 44 is disposed between the fixed and floating contacts 42 and 43 for normally biasing the floating contact 43 toward the keyhole or transverse wall 35. Referring to FIGS. 5 and 6, the underside of the transverse wall 35 in the vicinity of the small or narrow end 36A of the keyhole slot 36 is provided with an undercut groove 35A having a diameter sufficiently large to accommodate the contact disc 32B of the terminal contact 32 of the lamp in the locked position as shown in FIG. 6.

With the construction described, it will be noted that the germicidal lamp 30 is connected to the socket 31 by inserting the terminal 30B into the complementary socket 31. With the contact discs 32B aligned with the enlarged portions 36B of the keyhole slots 36, an axial force is applied to the lamp in the direction of the socket, causing the disc ends 32B of the contact pins 32 to project through the enlarged ends 36B of the keyhole slots 36. In doing so, the enlarged contact discs 32B engage and depress the floating contact 43. With the disc contacts 32B projected through the enlarged portions of the keyhole slots 36, the lamp 30 is twisted slightly to position the shank portion 32A of the contact pins 32 in the small ends 32A of the keyhole slots. In this position, the disc end 32B, having a diameter greater than that of the small end 36A of the keyhole slots, locks the lamp 30 to the socket 31 in a positive manner. Upon release of the axial pressure on lamp 30, the springs 44 will exert a spring bias on the floating contacts 43 for maintaining the electrical connection between the floating contacts 43 and the disc contact 32B. To effect the interlocking engagement between the lamp 30 and the socket 31 more secure, the undercut 35A is provided on the underside of the keyhole slot 36 in the vicinity of the small end portion 36A to provide a seat for accommodating the disc contact 32B in the locked position. It will be noted that spring 44 will bias the disc contact 32B to secure it within the undercut 35A in the assembled position of the lamp to prohibit an unintentional rotation between the lamp 30 and its socket 31. See FIG. 6.

To disconnect the lamp 30 from its socket 31, the lamp is axially displaced an amount sufficient to unseat the disc contact 32B from the undercut groove 35A. The lamp 30 is then counter-rotated slightly to align the disc contacts 32B with the enlarged portion 36B of the keyhole slots 36, whereby the lamp is free to be axially removed from the socket 31.

When the germicidal lamp 30 and associated socket 31 is utilized in a waste water treating apparatus, as herein described, (FIG. 1), the lamp 30 is securely and positively locked to its associated socket in a manner in which any vibratory motion imparted to the lamp will not cause any unintentional disconnect between the lamp and its socket.

Figures 7, 8:
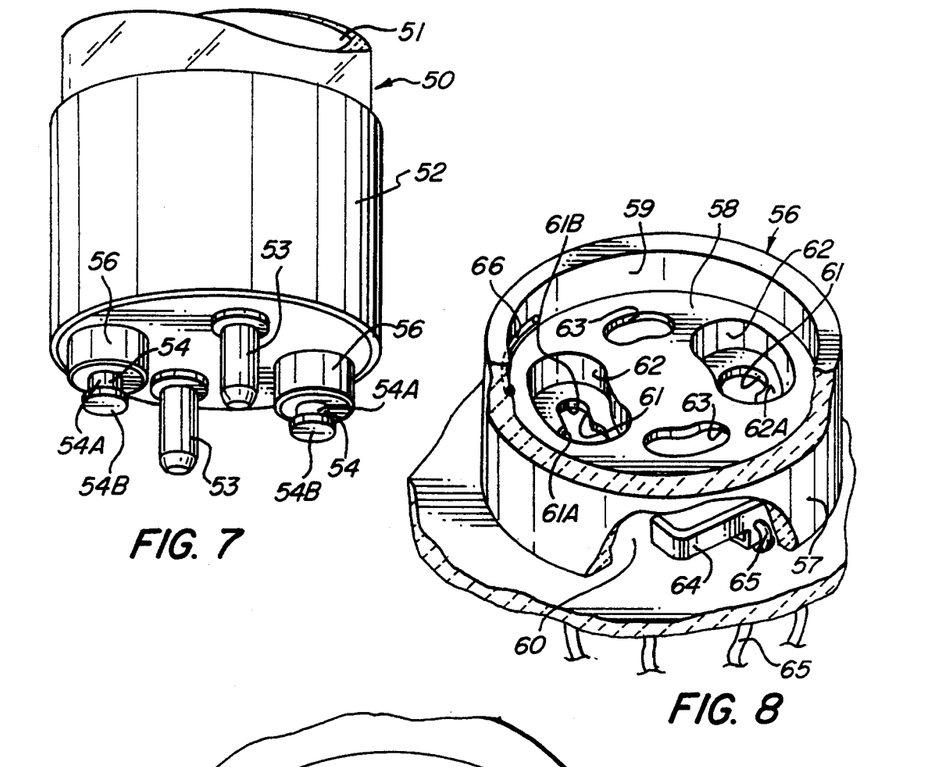
FIG. 7 is a partial perspective view of a germicidal lamp of a modified construction.
FIG. 8 is a perspective view of a modified socket construction adapted to receive the germicidal lamp of FIG. 11.
Figure 9:
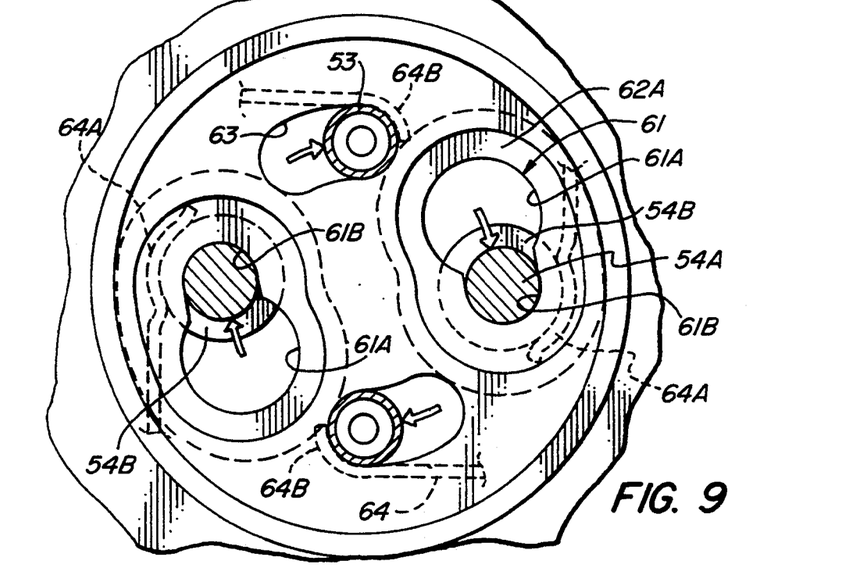
FIG. 9 is a sectional plan view illustrating the connection of the germicidal lamp of FIG. 7 to the socket of FIG. 8.

FIGS. 7 to 9 illustrate another embodiment of the invention. In this form of the invention, the germicidal lamp 50 comprises a quartz envelope 51 sealed by an end cap 52. In this form of the invention, end cap 52 is provided with four terminal or contact pins projecting therefrom. One pair of contact pins, e.g. pins 53—53, comprise the straight conventional type of contact pins which are electrically connected to one electrode of lamp 50. The other pair of contact pins 54—54, connected to the other electrode of lamp 50, are each provided on the free end thereof a contact disc 54B having a diameter greater than that of the shank portion 54A of pins 54—54. Each pair of pins 53—53 and 54—54 are diagonally or oppositely disposed. A cylindrical guide 56 circumscribes each of pins 54—54 wherein an annular space is defined between guides 56 and the contact disc 54B.

FIG. 8 illustrates a socket 56 adapted to accommodate or complement the terminal or contact pins of lamp 50. As shown, the socket 56 comprises a cylindrical base 57 having an intermediate transverse wall 58 to define a recess 59 disposed above the transverse wall 58 and a chamber 60 formed below the wall 58.

Formed in the transverse wall 58, there are a plurality of circumferentially spaced slots for accommodating the two pairs of contact pins 53—53 and 54—54. As shown, one pair of slots 61—61 are defined as a keyhole slot having an enlarged portion 61A and a reduced portion 61B. The enlarged portion 61A is sized sufficiently large to permit the contact disc 54B to be inserted therethrough. The small end 61B of the keyhole slot is sized to accommodate the shank portion 54A of the contact pin 54. Circumscribing the keyhole slot 61 is a cut-out or recess 62 for accommodating the guides 56 circumscribing each of contact pins 54. The other pair of slots 63—63 are defined as an elongated slot having a uniform width to accommodate the diameter of the straight pin contacts 54—54. It will be understood that the centerline of the respective pair of slots 61—61 and 63—63 are disposed on an arc as best seen in FIG. 9. Also, it will be noted that the enlarged portions 61A of the keyhole slots 61 are oppositely or diametrically opposed. Disposed in the lower chamber 60 of the base 56 are a plurality of contacts illustrated as spring fingers 64 arranged to make electrical contact with each of the pin contacts 53—53 and 54—54 when the lamp 50 is coupled to its base or socket 56. It will be understood that suitable wires or wire conductors 65 are electrically connected to each of the spring finger contacts 64.

To couple the lamp 50 to its complementary socket 56, the terminal ends of the lamp 50 are inserted into the recess 59 of the socket with the pin contacts 53, 54 aligned with the respective slots 61—61 and 63—63. The terminal contacts 53, 54 are aligned so that the disc contacts 54B—54B are inserted through the enlarged portion 61A—61A of the keyhole slots until the guides 56 bottom out on the floor 62A of the recess 62. The lamp 50 is then twisted or rotated so as to position the shank portion 54A of the pins 54—54 in the small end 61B of the keyhole slot 61 to positively lock the lamp to its socket. In the locked position, as shown in FIG. 9, the respective disc contacts 54B—54B are disposed in electrical contact with their respective spring contact fingers 64A—64A. Also, contact pins 53 are disposed into electrical contact with their corresponding spring contact fingers 64B—64B. In the coupled position, it will be noted that the lamp 50 is positively locked to its associated socket 56. As hereinbefore described, the interlocking arrangement of FIGS. 7 to 9 will prohibit any accidental disconnect between the lamp and its socket.

To disengage or uncouple the lamp 50 from its associated socket 56, a positive counter twist or rotation is required to be applied to the lamp 50 to bring the disc contacts 54B into alignment with the enlarged opening 61A of the keyhole slot to permit axial removal of the lamp 50 from its socket 56.

It will be understood that the floating contacts 43 and associated components, as described in FIGS. 3 to 6, can be readily interchanged or substituted for the spring fingers 64 of FIGS. 7 to 9 to effect the electrical contact between the lamp and its associated socket, and vice versa.

To render the coupling between the lamp and its corresponding socket fluid tight, a suitable sealing ring or gasket 66 may be interposed between the end cap of the lamp and internal surface of the socket, as seen in FIG. 8. The same type of sealing may be effected in the embodiment of FIGS. 1 to 6.

FIGS. 10 to 13 illustrate a further embodiment of the present invention. In germicidal lamps for use in water purification systems having more than two contact or terminal pins projecting from one end of the lamp, it has been observed that arcing between the contact or terminal pins of the respective lamp electrodes may occur. Such arcing may short circuit the electrodes which will adversely diminish the useful life of the lamp. To prohibit arcing between the contacts or terminal pins of the respective lamp electrodes, the lamp is provided with a modified end cap construction to define end faces that are longitudinally spaced from each other. The respective contact or terminal pins of the respective lamp electrodes are arranged to be disposed in the longitudinal spaced faces so as to prohibit arcing between the pin contacts of the respective electrodes. The longitudinal spacing or offset of the contact or terminal pins of the respective electrodes function to shield or separate the opposed pin contacts of the respective electrodes from arcing to one another.

Figure 10:
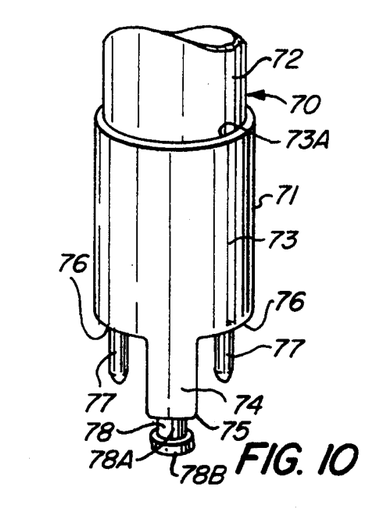
FIG. 10 is a fragmentary longitudinal side view of another modified lamp construction embodying the invention.
Figure 11:
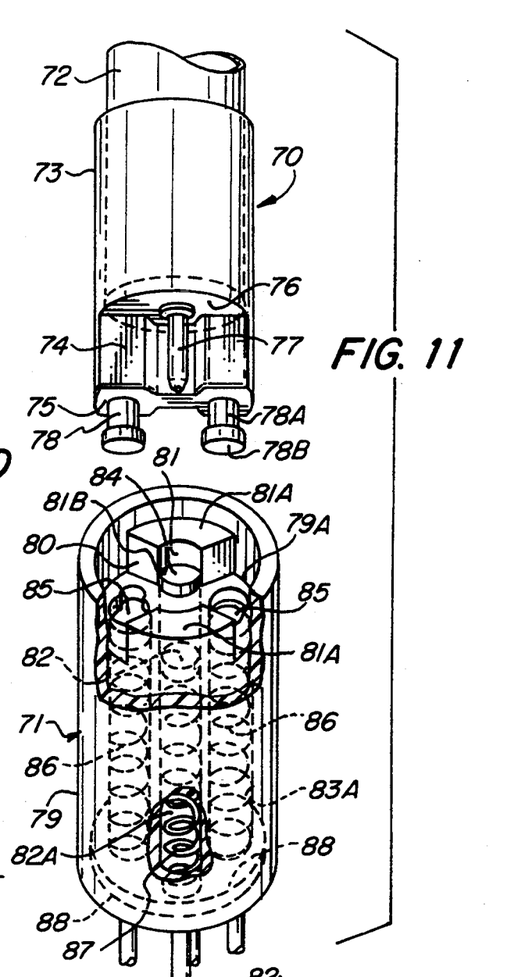
FIG. 11 is a perspective exploded view of the lamp construction of FIG. 10 and its complementary socket construction.

FIGS. 10 to 13 illustrate a germicidal lamp 70 and complementary socket 71 construction for prohibiting such arcing between the terminal or contact pins of the respective lamp electrodes and embodying the interlocking features of the present invention. FIG. 10 illustrates a germicidal lamp 70 which includes the quartz envelope 72, housing the opposed electrodes (not shown) of the lamp. It will be understood that both ends of the quartz envelope are sealed by end caps in a well known manner. In the illustrated embodiment of FIGS. 10 to 13, the terminal or contact pins of the respective electrodes projects from a modified end cap 73 connected at one end of the lamp 70. As shown, the end cap 73 is defined as a cylindrical cup 73A having the bottom end provided with transversely extending projection 74 to define an end face 75 disposed between longitudinally spaced opposed end faces 76—76. As shown at FIGS. 10 and 11, the respective end faces 75 and 76—76 are stepped or offset longitudinally from each other.

Projecting from each of the end faces 76—76 is a contact pin or terminal pin 77 which are electrically connected to one of the electrodes of the lamp 70. In the illustrated embodiment, the contact or terminal pins 77 comprise conventional straight pins as shown.

Projecting from end face 75 are a pair of contact or terminal pins 78, which include a shank portion 78A and an enlarged head end or disc 78B, as hereinbefore described. It will be understood that the terminal pins 78 are electrically connected to the other electrode of the lamp 70.

The complementary socket 71 includes a base 79 formed as a cylinder of a non-conducting material. An insert 79A, defining a transverse groove 80 having opposed side walls 81—81 projecting above the bottom 80A of the groove 80, is disposed within the base. The opposed side walls 81—81 and upper ends 81A—81A complement the stepped and opposed faces 76—76 of the end cap 73.

Figure 12:
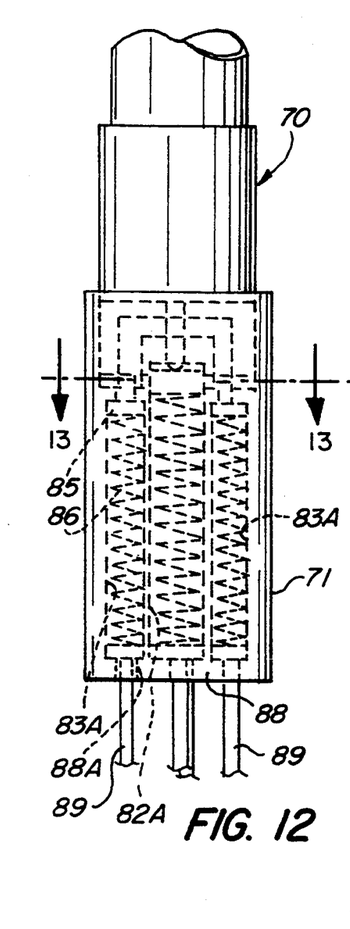
FIG. 12 is a sectional view illustrating the lamp construction and complementary socket construction of FIGS. 10 and 11 in the assembled or connected position.

Formed in the bottom wall 80A of the groove 80 are two opposed pairs of apertures or openings 82—82 and 83—83. In the illustrated embodiment, opposed openings 82—82 are circular whereas openings 83—83 are formed in a keyhole shape, as hereinbefore described. Disposed in alignment with each of the openings 82—82 and 83—83 is a bore 82A and 83A respectively, which extend longitudinally of the insert 79A. Disposed within each bore 82A and 83A is a floating contact disc 84 and 85 respectively. As shown in FIG. 12, contact discs 85 are normally biased against the bottom of the groove 80 by a spring 86 disposed in bores 83A—83A. Contact discs 84 are biased toward a stop 81B formed in the opposed sidewalls 81 by springs 87 disposed in bores 82A. A bottom wall 88, suitably secured to the bottom of the insert 79A, retains the springs 86, 87 within their respective bores 82A, 83A. The bottom wall 88 is provided with suitable openings 88A through which the electrical conductors or wires 89 extend to connect to a source of electrical current for energizing the lamp. It will be understood that the wires are connected in a suitable manner in electrical contact with each of the floating contacts 84, 85.

Figure 13:
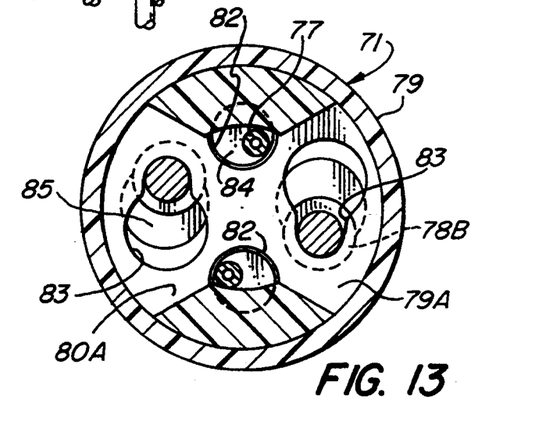
FIG. 13 is a sectional plan view taken along line 13—13 on FIG. 12.

To effect connection of the germicidal lamp 70 to its complementary sockets 71, the contact pins of the lamp 70 are inserted into the socket 71 so that the projection 74 is aligned with the transverse groove 80 and the discs 78B of contact pins 78 aligned with the enlarged portions of the keyhole openings as hereinbefore described. Axial pressure applied between the lamp 70 and the socket 71 will cause contact pins 82—82 and 83—83 to engage and depress the respective contact discs 84, 85 respectively. To lock the lamp 70 to socket 71, the lamp is rotated to shift the shank portion 78A of the contact pins 78 into the small end of the keyhole slot 83 as hereinbefore described. To detach the lamp 70 from its socket 71, the lamp is rotated in the opposite direction so as to realign the disc portions 78B of the contact pins 78 with the enlarged portion of the keyhole slot whereby the lamp is then axially removed.

While the foregoing embodiments have been particularly described as having particular application to a germicidal ultraviolet lamp for use in a waste water treating apparatus, the lamp and socket construction can also be applied to fluorescent lamps.

Figures 14, 15:
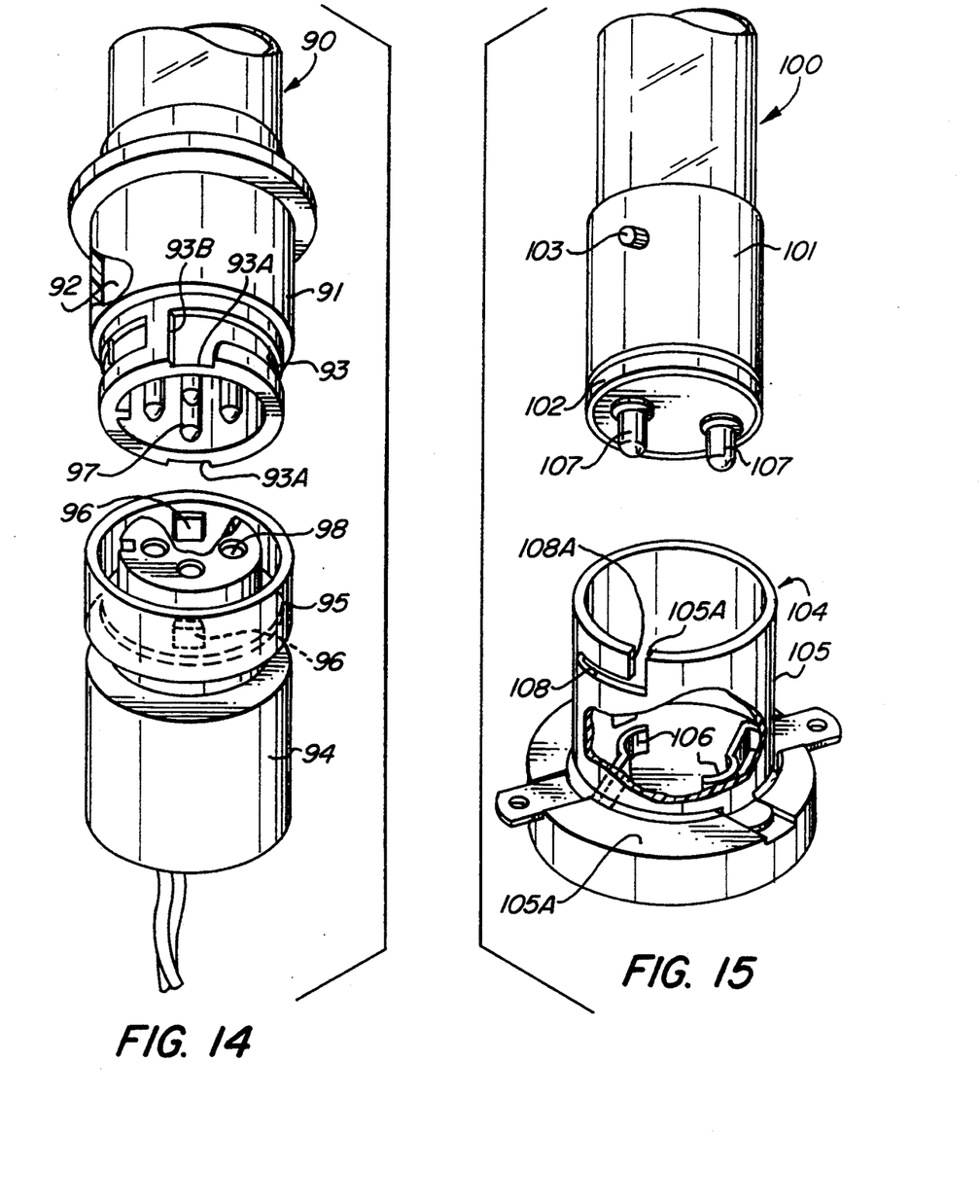
FIG. 14 is an exploded perspective view of a modified embodiment.
FIG. 15 is an exploded perspective view of another modified form of the invention.

FIG. 14 relates to a modified embodiment of the invention. In this form of the invention, the germicidal lamp 90 is provided with a locking cylinder 91 which is suitably connected to the end cap 92 of a conventionally known germicidal lamp as illustrated in FIG. 1. The base portion of the locking cylinder 91 is provided with a locking groove 93 extending circumferentially about the exterior periphery of the locking cylinder 91. The groove 93 includes opposed channels 93A extending normal thereto and communicates therewith at opposed sides thereof.

Rotatably journalled about the end of a complementary socket 94 of general or conventional construction is a collar 95, which is arranged to circumscribe the locking collar 91 in the connected portion of the lamp 90. Oppositely disposed in circumferentially spaced relationship on the interior surface of the rotating or latching collar 95 are latching projections 96—96. To latch or lock the lamp 90 to its associated socket 94, the contact pins 97 of the lamp are inserted into the pin holes 98 of the socket with the projecting latches 96—96 of the rotating collar 95 aligned with the channels 93A—93A. Upon seating of the pin contacts 97 in the respective pin holes 98 to effect the electrical connection, the locking collar 95 is rotated relative the locking cylinder 91 so that latches 96—96 are shifted relative to the groove 93 to confine the latching projection 96—96 within the groove 93. With the latching projections 96—96 confined within groove 93, it will be noted that the lamp 90 cannot be axially disconnected from its socket 94. To effect a disconnection of the lamp 90, the locking collar 95 is required to be counter-rotated in the opposite direction to bring channels 93A—93A back into alignment with the projecting latches 96—96. The vertical edge 93B of channel 93 defines a stop for projection latches 96 which occurs when the projection latches 96 are brought into alignment with the opposed channels 93A—93A. Upon alignment of the latches 96—96 with channels 93A—93A, the lamp 90 is free to be disconnected by axial withdrawal of the lamp 90 from its socket 94.

FIG. 15 illustrates another modified form of the invention. In this form, the germicidal lamp 100 may be of a generally known construction in which a locking cylinder 101 is suitably secured to an end cap 102 of the lamp 100. The locking cylinder 101 is provided with a projecting latch in the form of a pin 103 that extends laterally therefrom. In an alternate arrangement, the pin 103 may be formed as an integral part of the end cap 102.

The complementary socket 104, as illustrated, comprises a cylindrical base 105 for receiving the end of the lamp 100. On the bottom 105A are the electrical contacts in the form of spring fingers 106—106 for effecting electrical connection with the terminal or contact pins 107 of the lamp. The base 105 adjacent the upper end thereof is provided with a bayonet slot 108 that has a connected channel 108A that opens to the upper periphery 105A of base 105.

To connect and lock lamp 100 to its socket 104, the end of the lamp is inserted to the base 105 so that the latching pin 103 is aligned with channel 108A to bottom pin 108A in groove or slot 108. By effecting a slight rotation of the lamp relative to the base, the projecting pin 103 becomes secured intermediately of slot 108. Thus, the lamp is locked to the base to prevent any unintentional axial separation between the lamp 100 and its base 105.

To disconnect, the lamp 100 is counter-rotated to align the projecting pin 103 with channel 108A, whereupon the lamp can be axially withdrawn from the socket 104.

With the various constructions described, it will be apparent that the described lamp and socket constructions have particular application in a waste water treating apparatus to alleviate a heretofore troublesome problem of ultraviolet lamps accidentally disconnecting due to vibrations imparted thereto during the operation of such apparatuses.

While the invention has been described with respect to the illustrated embodiments, it will be readily understood and appreciated by those skilled in the art that variations and modifications may be made without departing from the spirit or scope of the invention.

What is claimed is:

1. A waste water purification system comprising:
    a housing defining a flow chamber through which water to be treated flows,
    a plurality of ultraviolet germicidal lamps disposed in said flow chamber,
    each of said lamps including an elongated envelope,
    an end cap sealing the end of said envelope,
    a plurality of electrical contact pins projecting from said end sealing cap,
    a complementary socket for receiving said electrical contact pins of said lamp for effecting the electrical connection therebetween,
    and means for maintaining said lamps in a positive mechanical interlocking relationship with said complementary socket in the assembled position so as to prevent any inadvertent electrical disconnection between said lamp and socket in the operative position of said purification system.

2. A waste water purification system as defined in claim 1 wherein said electric contact pins of said lamps include
    a shank portion and an enlarged contact head end portion,
    and said socket including a transverse wall having an aperture for receiving each of said contact pins,
    and said aperture having an enlarged portion sized to receive said contact head end portion and a connected small end portion sized to accommodate said shank portion,
    a spring biased contact disposed adjacent said aperture for engaging in electrical contact with said contact pins whereby said lamp is positively interlocked with said socket by insertion of said contact pins through the enlarged aperture portions and rotating said lamp relative to said socket to position said shank portion in the small end portion of said aperture.

3. A waste water purification system as defined in claim 2 wherein said spring bias contact includes
    a floating contact disposed adjacent said aperture,
    and a spring biasing said floating contact toward said aperture.

4. A waste water purification system as defined in claim 3 wherein
    said transverse wall includes an undercut portion subjacent the small end portion of said aperture to define a seat for enlarged contact head end of said contact pin in the connected and locked position of said lamp to said socket so that both an axial and rotative force is required to disconnect said lamp from its complementary socket.

5. A waste water purification system comprising
    a housing defining a flow chamber through which water to be treated flows,
    said chamber having a water inlet and a water outlet,
    a plurality of ultraviolet germicidal lamps disposed in said flow chamber in the flow path of the water to be treated,
    each of said germicidal lamps including an elongated envelope,
    said envelope being sealed on at least one end by an end cap,
    a plurality of contact pins projecting outwardly of said end cap,
    said plurality of contact pins including at least one pair of spaced apart locking contact pins,
    said locking contact pins including a shank portion and a connected enlarged head end portion,
    a socket for receiving said lamp for effecting an electrical connection,
    said socket including a transverse wall having opposed apertures for receiving said locking contact pins,
    said opposed apertures having a keyhole shape with an enlarged portion and a small end portion,
    the enlarged portions of said aperture being diametrically opposed,
    said transverse wall having a subjacent undercut disposed about the small end of said aperture,
    a floating contact disposed below each of said apertures,
    and a spring means biasing said floating contact toward said aperture whereby said lamp is attached by axially inserting the enlarged head end of the contact pins into said enlarged portion of said aperture depressing said floating contact and effecting relative rotation of said lamp to dispose the shank portion of said contact pins in the small end portions of said apertures,
    whereby said spring bias said enlarged head end of said contact pin to seat in said undercut to lock said lamp within said socket in electrical contact.

6. A germicidal lamp and complementary socket assembly for use in a water purification system comprising
    a germicidal lamp,
    a plurality of contact pins projecting from one end of said lamp,
    a complementary socket for receiving said contact pins,
    and means for maintaining said lamp and socket in positive interlocking relationship and in electrical contact within said socket in the assembled position so as to prohibit said lamp from inadvertently electrically disconnecting from said socket.

7. A germicidal lamp and complementary socket assembly comprising
    a germicidal lamp having an end cap,
    a plurality of contact pins projecting from said end cap,
    said contact pins having an enlarged locking head end,
    a socket for receiving said lamp,
    said socket including transverse wall,
    apertures formed in said transverse wall for receiving each of said contact pins, a contact means associated with each of said apertures to effect electrical connection with said contact pins received in each of said apertures, and said apertures including means for positively locking said enlarged locking head end of said contact pins to said socket when said lamp and socket are in the assembled position.

8. A germicidal lamp and complementary socket assembly as defined in claim 7 wherein said contact pins include a shank portion, and said enlarged head end being defined as a flat contact disc having a diameter greater than that of said shank portion.

9. A germicidal lamp and complementary socket assembly as defined in claim 8 wherein said apertures having a keyhole shape with an enlarged end portion and a small end portion, said enlarged end portion being sized to allow said flat contact disc to be inserted therethrough, and said small end portion being sized to receive said shank portion of said contact pin.

10. A germicidal lamp and complementary socket assembly as defined in claim 9 wherein the enlarged end portions of said apertures are diagonally and oppositely disposed whereby said lamp is interlocked by effecting a slight relative rotation between said lamp and complementary socket.

11. A germicidal lamp and complementary socket as defined in claim 10 wherein said transverse wall is provided with an undercut subjacent to the small end portion of said apertures to define a seat for accommodating said flat contact disc in the locked position of said lamp and socket assembly.

12. A germicidal lamp and complementary socket as defined in claim 10 wherein said contact means includes a floating contact associated with each of said apertures, and a means for normally biasing said floating contact for maintaining electrical contact with said contact pins in the connected and locked position of said lamp and complementary socket.

13. A germicidal lamp and complementary socket assembly as defined in claim 12, wherein said biasing means comprises a coil spring.

14. A germicidal lamp and complementary socket as defined in claim 10 wherein said contact means includes a spring finger, said spring finger engaging said contact pins in the connected and locked position of said lamp and socket.

15. A germicidal lamp and complementary socket as defined in claim 6 and including a sealing means forming a fluid tight seal between said lamp and socket in the connected and locked position.

16. A germicidal lamp and complementary socket assembly for use in a waste water purification system comprising a germicidal lamp having an elongated envelope for containing opposed electrodes, an end cap sealing the end of said elongated envelope, a plurality of contact pins projecting out from said end cap, said plurality of contact pins including a first pair of oppositely disposed locking contact pins adapted to be electrically connected to one electrode, and a second pair of contact pins adapted to be electrically connected to another electrode, said first pair of locking pins each including a shank portion and a connected enlarged head end portion, a complementary socket for receiving said germicidal lamp, said socket including a base having a transversely extending wall, a plurality of apertures formed in said transversely extending wall, said plurality of apertures including a first pair formed in the shape of a keyhole slot having an enlarged end portion and a small end portion, and a second pair of non-keyhole shape, each of said first and second pairs of apertures being diametrically and oppositely opposed, an electrical contact means associated with each of said apertures for engaging said contact pin in electrical contact in the assembled position of said lamp and socket, whereby said lamp and socket are positively locked by the interlocking of said locking contact pins in said keyhole slots.

17. A germicidal lamp and complementary socket assembly as defined in claim 16 wherein said electrical contact means comprises a bore formed in said base disposed in alignment with each of said apertures, a floating contact slidably disposed in each of said bores, and a spring disposed in each of said bores for normally biasing said floating contacts in electrical connection with said contact pins in the assembled and locked position of said lamp and socket.

18. A germicidal lamp and complementary socket assembly as defined in claim 16 wherein said end sealing cap includes longitudinally offset spaced apart faces, said first pair of locking contact pins projecting from one of said spaced faces, and said second pair of contact pins projecting from another of said spaced apart faces, and said base having means complementing said longitudinally offset faces of said end cap.

19. A germicidal lamp and complementary socket assembly as defined in claim 16 wherein said second pair of contact pins comprises straight pins.

20. A germicidal lamp and socket assembly comprising a germicidal lamp having an elongated envelope adapted for encasing therein a pair of electrodes, an end cap for sealing the end of said envelope, said end cap having longitudinally spaced apart end faces, a first pair of locking contact pins projecting outwardly from one of said end faces, each of said first pair of locking contact pins including a shank portion and a connected enlarged head end portion, a second pair of contact pins projecting form another of said spaced apart faces of said end cap, a complementary socket, said complementary socket including a member having faces complementing the offset faces of said end cap, said member having a plurality of apertures formed therein for receiving said first and second pair of contact pins, said plurality of apertures including a first pair formed in the shape of a keyhole slot having an enlarged end portion and a small end portion, said enlarged end portion of said first pair of apertures being diametrically opposed, said plurality of apertures including a second pair of apertures, a bore disposed in alignment with each of said apertures, a floating contact displaceably disposed in each of said bores, a spring means disposed in each of said bores for normally biasing said contacts therein, whereby said lamp is positively locked to said socket by inserting said lamp into said socket by aligning the enlarged end of said locking contact pins with the enlarged end portion of said keyhole shaped slot and effecting rotation of said lamp relative to said socket to position the shank portion of said locking pins in the small end of said keyhole slots.

21. A germicidal lamp and complementary socket comprising a germicidal lamp having an end cap, a plurality of contact pins projecting from said end cap, a locking cylinder connected to said end cap, said locking cylinder including a locking groove circumscribing said cylinder, opposed channels in connection with said locking groove, a complementary socket, a collar rotatably journalled to said socket, opposed latch projections connected to said collar arranged to be disposed in alignment with said channels, whereby said lamp, upon insertion of said contact pins in said socket, is mechanically locked thereto by rotation of said collar relative to said locking cylinder.

22. A germicidal lamp and complementary socket comprising a germicidal lamp having an end sealing cap and projecting contact pins, a latch pin projecting laterally from said end cap, a complementary socket, said socket including a cylindrical base, spring contacts disposed in said base to engage in electrical contact with said contact pins in the assembled portion of said lamp, and a bayonet slot formed in said base for engaging said latch pin in the assembled position for positively locking said lamp to said base.

* * * * *